United States Patent
Lin et al.

(10) Patent No.: US 9,405,880 B2
(45) Date of Patent: Aug. 2, 2016

(54) SEMICONDUCTOR ARRANGEMENT FORMATION

(71) Applicant: Taiwan Semiconductor Manufacturing Company Limited, Hsin-Chu (TW)

(72) Inventors: Yen-Hung Lin, Hsinchu (TW); Chi Wei Hu, Pingzhen (TW); Yuan-Te Hou, Hsinchu (TW); Chung-Hsing Wang, Baoshan Township (TW); Chin-Chou Liu, Jhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 146 days.

(21) Appl. No.: 14/279,462

(22) Filed: May 16, 2014

(65) Prior Publication Data
US 2015/0331990 A1 Nov. 19, 2015

(51) Int. Cl.
*G06F 17/50* (2006.01)

(52) U.S. Cl.
CPC ........ *G06F 17/5081* (2013.01); *G06F 17/5031* (2013.01); *G06F 17/5077* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 6,009,248 A * | 12/1999 | Sato | ..................... | G06F 17/5068 716/114 |
| 7,010,765 B2 * | 3/2006 | Liu | ...................... | G06F 17/505 716/106 |
| 7,367,005 B2 * | 4/2008 | Kosugi | ................ | G06F 17/5036 716/114 |
| 7,412,680 B1 * | 8/2008 | Gouterman | ......... | G06F 17/5077 716/114 |
| 7,519,933 B2 * | 4/2009 | Dutt | ...................... | G06F 17/505 716/114 |
| 8,091,058 B2 * | 1/2012 | Ballard | ............... | G06F 17/5077 716/104 |
| 8,327,308 B2 * | 12/2012 | Nakagawa | ............ | G06F 17/505 716/106 |
| 8,365,120 B2 * | 1/2013 | Alpert | ................. | G06F 17/5077 716/110 |
| 8,402,418 B2 * | 3/2013 | Berry | .................. | G06F 17/5077 716/118 |
| 2004/0221253 A1 * | 11/2004 | Imper | ................. | G06F 17/5072 716/114 |
| 2009/0293033 A1 * | 11/2009 | Ito | ....................... | G06F 17/5068 716/113 |
| 2013/0219352 A1 * | 8/2013 | Ishikawa | ............. | G06F 17/5068 716/108 |

* cited by examiner

*Primary Examiner* — Leigh Garbowski
(74) *Attorney, Agent, or Firm* — Cooper Legal Group, LLC

(57) ABSTRACT

A method of forming a semiconductor arrangement is provided. The semiconductor arrangement includes an interconnection arrangement comprising a first connection between a driver and a receiver. At least one buffer is disposed along the first connection to reduce delay associated with the interconnection arrangement. However, buffers increase power consumption, and thus a determination is made as to whether a buffer is unnecessary. A buffer is determined to be unnecessary where removal of the buffer does not violate a timing constraint regarding an amount of time a signal takes to go from the driver to the receiver. If a buffer is determined to be unnecessary, the buffer is removed to reduce power consumption.

20 Claims, 9 Drawing Sheets

SEMICONDUCTOR ARRANGEMENT FORMATION

BACKGROUND

Electronic design tools allow designers to layout, simulate, and analyze circuitry, such as integrated circuits. In an example, a schematic designer creates a schematic diagram of an integrated circuit. The schematic diagram comprises symbols that represent components of the integrated circuit. However, the schematic diagram does not represent a physical layout of the integrated circuit. A layout designer creates a physical layout, such as a design layout, of the integrated circuit using the schematic diagram. The design layout comprises one or more polygons representing metal, silicon, buffers, or other components or portions thereof.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
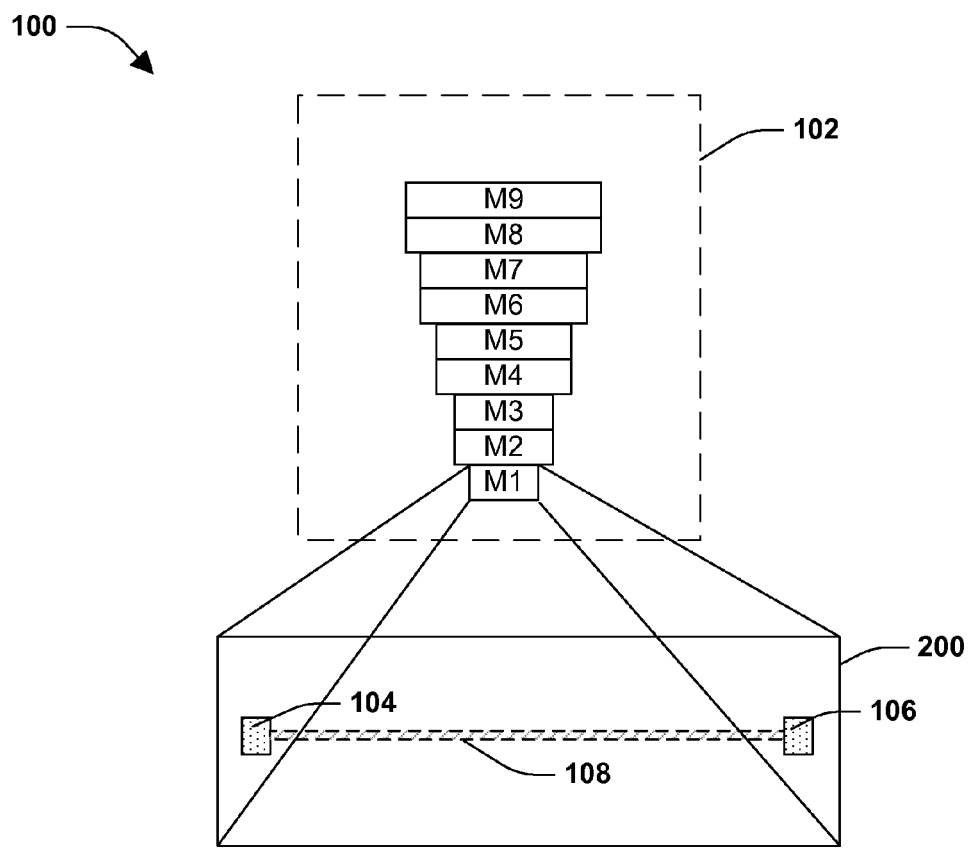
FIG. 1 is an illustration of a semiconductor arrangement, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One or more techniques for forming a semiconductor arrangement and resulting structures formed thereby are provided herein. Some embodiments of the present disclosure have one or a combination of the following features and/or advantages.

Turning to FIG. 1, a semiconductor arrangement 100 comprises one or more metal layers M1-M9 and an interconnection arrangement 200 that is routed through at least some of the metal layers. In some embodiments, the interconnection arrangement 200 comprises a first connection 108 between a driver 104 and a receiver 106, where the driver 104 and the receiver 106 are in a lower metal layer, such as M1.

According to some embodiments, a size of a conductive line increases in upper metal layers as compared to lower metal layers. According to some embodiments, the size of a conductive line corresponds to a cross-sectional dimension of the conductive line, such as diameter. Accordingly, a conductive line in M2 has a larger diameter than a diameter of a conductive line in M1, a conductive line in M3 has a larger diameter than a diameter of a conductive line in M2, a conductive line in M4 has a larger diameter than a diameter of a conductive line in M3, and so on. According to some embodiments, a larger conductive line has a lower resistance than a smaller conductive line, where a lower resistance yields improved performance such as at least one of decreased power consumption or increased speed. Accordingly, although not illustrated, at least some of the first connection 108 is routed through at least one upper metal layer that is above the lower metal layer comprising the driver 104 and the receiver 106.

However, losses occur when routing through different metal layers. For example, metal layers are separated from one another by dielectric material(s). Relatively small interconnects, such as vias, are formed through the dielectric material(s) to connect metal layers. For example, one or more first vias pass through a first layer or region of dielectric material to connect M1 to M2, one or more second vias pass through a second layer or region of dielectric material to connect M2 to M3, and so on. In some embodiments, such interconnects have a relatively high resistance and thus increase a delay when routing through different metal layers. In some embodiments, the delay is increased when routing through multiple metal layers due to variations in resistance among the different size conductive lines in the different metal layers. In some embodiments, the delay is increased by increasing an overall distance or length of the route when routing through multiple metal layers.

Accordingly, although not illustrated in FIG. 1, one or more buffers are disposed along the first connection 108 to decrease delay. However, buffers increase power consumption and thus a determination is made, according to some embodiments, as to whether a buffer is unnecessary. A buffer is determined to be unnecessary where removal of the buffer does not violate a timing constraint regarding an amount of time a signal takes to go from the driver 104 to the receiver 106. If a buffer is determined to be unnecessary, the buffer is removed to reduce power consumption.

Figure 2A:
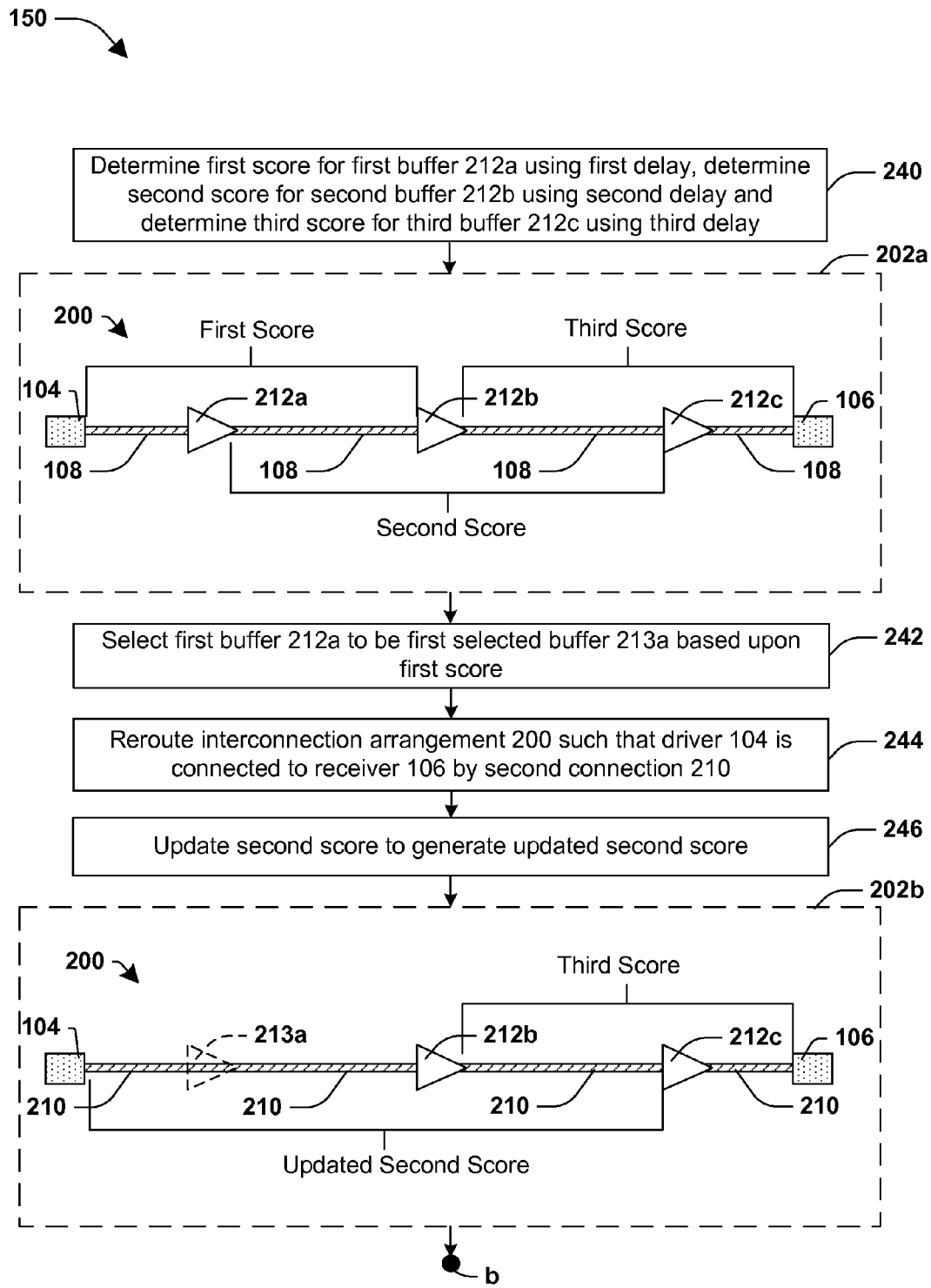
FIG. 2A is a flow diagram illustrating a method of forming a semiconductor arrangement, in accordance with some embodiments.
Figure 2B:
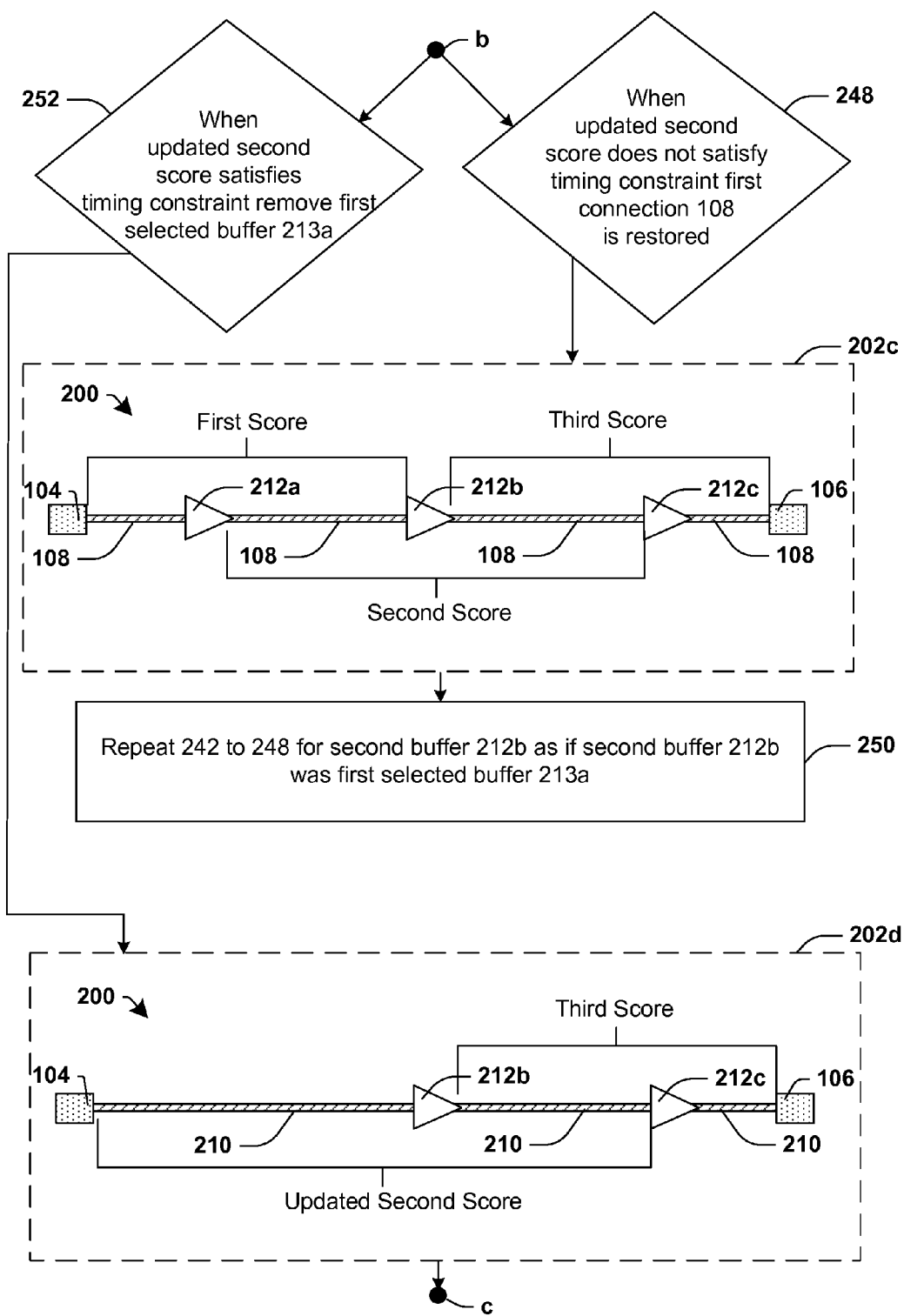
FIG. 2B is a flow diagram illustrating a method of forming a semiconductor arrangement, in accordance with some embodiments.
Figure 2C:
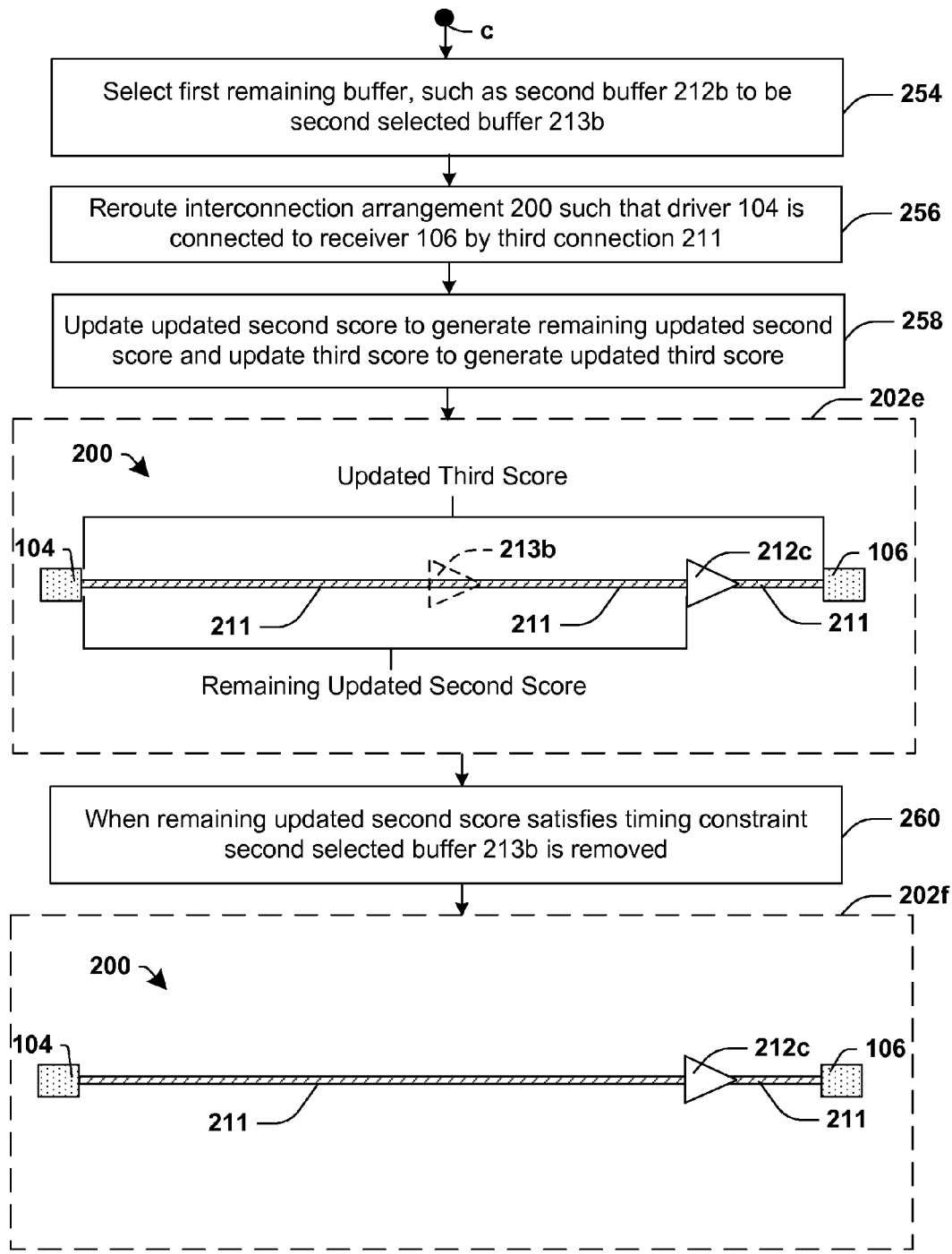
FIG. 2C is a flow diagram illustrating a method of forming a semiconductor arrangement, in accordance with some embodiments.

Turning to FIG. 2A, a method 150 of forming the semiconductor arrangement 100 according to some embodiments is illustrated. The interconnection arrangement 200 is also illustrated in FIGS. 2A-2C to depict the interconnection arrangement 200 at various stages of fabrication 202a-202f corresponding to different operations of the method 150. The interconnection arrangement 200 illustrated in FIG. 2A has three buffers: a first buffer 212a, a second buffer 212b and a third buffer 212c, according to some embodiments. A different number of buffers is within the scope of various embodiments.

At 240 of method 150, as illustrated in a first intermediate stage of fabrication 202a, a first score is determined for the first buffer 212a using a first delay, a second score is determined for the second buffer 212b using a second delay and a third score is determined for the third buffer 212c using a third delay, according to some embodiments. In some embodiments, a delay encompasses at least one of a positive delay or a negative delay, where a positive delay denotes an increase in an amount of time a signal takes to travel or pass from the driver 104 to the receiver 106 and a negative delay denotes a decrease in an amount of time a signal takes to travel or pass from the driver 104 to the receiver 106.

In some embodiments, the first delay for the first buffer 212a is determined in the interconnection arrangement 200, where the first buffer 212a is disposed along the first connection 108 between the driver 104 and the receiver 106. In some embodiments, the second delay for the second buffer 212b is determined, where the second buffer 212b is disposed along the first connection 108 between the driver 104 and the receiver 106. In some embodiments, the third delay for the third buffer 212c is determined, where the third buffer 212c is disposed along the first connection 108 between the driver 104 and the receiver 106. In some embodiments, an Elmore delay model, illustrated in equation (1) below, is used to calculate at least one of the first delay, the second delay or the third delay.

$$\text{delay}(i) = \sum_{all\_node\_k} R_{ki}^* \times C_k^* \quad (1)$$

In equation (1), $R_{ki}$ is the sum of all resistance that is common to two paths. According to some embodiments, a first path of the two paths is from at least one of the driver 104 or a buffer, such as the first buffer 212a, the second buffer 212b or the third buffer 212c to node i, where node i is at least one of the first buffer 212a, the second buffer 212b, the third buffer 212c or the receiver 106. According to some embodiments, a second path of the two paths is from at least one of the driver 104 or a buffer, such as the first buffer 212a, the second buffer 212b or the third buffer 212c, to node k, where node k is at least one of the first buffer 212a, the second buffer 212b, the third buffer 212c or the receiver 106. According to some embodiments, node i and node k are at different locations. In some embodiments, $C_k$ is the capacitance of the node k. In some embodiments, the resistance and the capacitance are derived based on a length of a connection, such as a length of the first connection 108, including one or more metal layers through which the first connection 108 is routed.

To determine the first delay, for example, $R_{ki}$ is the sum of the resistance of the first path plus the resistance of the second path, where the first path is between the driver 104 and node i, where node i is the first buffer 212a, and the second path is between the driver 104 and node k, where node k is the second buffer 212b. According to some embodiments, $C_k$ is the capacitance of node k.

According to some embodiments, and with reference to 202a in FIG. 2A, the first delay corresponds to a delay for the area encompassed by the bracket designating the first score, such that the first delay measures a delay of a first portion of the first connection 108 between the driver 104 and the first buffer 212a, a delay of the first buffer 212a, and a delay of a second portion of the first connection 108 between the first buffer 212a and the second buffer 212b.

According to some embodiments, and with reference to 202a in FIG. 2A, the second delay corresponds to a delay for the area encompassed by the bracket designating the second score, such that the second delay measures the delay of the second portion of the first connection 108 between the first buffer 212a and the second buffer 212b, a delay of the second buffer 212b, and a delay of a third portion of the first connection 108 between the second buffer 212b and the third buffer 212c.

According to some embodiments, and with reference to 202a in FIG. 2A, the third delay comprises a delay of the area encompassed by the bracket designating the third score, such that the third delay measures the delay of the third portion of the first connection 108 between the second buffer 212b, a delay of the third buffer 212c, and a delay of a fourth portion of the first connection 108 between the third buffer 212c and the receiver 106.

According to some embodiments, the first score for the first buffer 212a is determined by assessing or ranking the first delay relative to the second delay and the third delay. According to some embodiments, the second score for the second buffer 212b is determined by assessing or ranking the second delay relative to the first delay and the third delay. According to some embodiments, the third score for the third buffer 212c is determined by assessing or ranking the third delay relative to the first delay and the second delay. According to some embodiments, a greater delay indicates a higher score.

At 242 of method 150, as illustrated in a second intermediate stage of fabrication 202b, the first buffer 212a is selected to be a first selected buffer 213a based upon the first score, according to some embodiments. In some embodiments, the first buffer 212a is selected to be the first selected buffer 213a when the first delay is a greater delay as compared to the second delay and the third delay, and the first score is thus a higher score as compared to the second score and the third score.

At 244 of method 150, as illustrated in the second intermediate stage of fabrication 202b, the interconnection arrangement 200 is rerouted such that the driver 104 is connected to the receiver 106 by a second connection 210 that bypasses the first selected buffer 213a, according to some embodiments. In some embodiments, the second connection 210 comprises a portion of the first connection 108, such as the portion of the first connection 108 that intersects the second buffer 212b and the third buffer 212c. In some embodiments, the second connection 210 is routed through a first upper metal layer of the semiconductor arrangement 100 that is different than a metal layer within which the driver 104 and the receiver 106 are disposed.

At 246 of method 150, as illustrated in the second intermediate stage of fabrication 202b, the second score is updated to generate an updated second score when the first buffer 212a is the first selected buffer 213a, according to some embodiments. In some embodiments, generating the updated second score comprises using the Elmore delay model as shown above in equation (1) to calculate a first updated delay of a first remaining buffer, where the first remaining buffer is not the first selected buffer 213a.

In some embodiments, the updated second score corresponds to a delay of the area encompassed by the bracket designating the updated second score, such that the updated second delay measures a delay of a first portion of the second connection 210 between the driver 104 and the second buffer 212b, the delay of the second buffer 212b, and a delay of a second portion of the second connection 210 between the second buffer 212b and the third buffer 212c. In some embodiments, the first remaining buffer is at least one of the second buffer 212b or the third buffer 212c. In some embodiments, the third score is not updated because the removal of the first selected buffer 213a, when the first selected buffer 213a is the first buffer 212a, does not alter the third score of the third buffer 212c.

Turning to FIG. 2B, which is a continuation from point b of FIG. 2A, at 248 of method 150, as illustrated in a third intermediate stage of fabrication 202c, when the updated second score does not satisfy a timing constraint the first connection 108 is restored, according to some embodiments. In some embodiments, the timing constraint corresponds to an amount of time a signal takes to pass from the driver 104 to the receiver 106. In some embodiments, the timing constraint is based upon an original configuration, such as where the first buffer 212a, the second buffer 212b and the third buffer 212c are disposed along the first connection 108 between the driver 104 and the receive 106. In some embodiments, satisfying the timing constraint comprises not increasing the amount of time the signal takes to pass from the driver 104 to the receiver 106. In some embodiments, restoring the first connection 108 comprises returning the first buffer 212a to an original position disposed between the driver 104 and the second buffer 212b.

At 250 of method 150, when the updated second score does not satisfy the timing constraint, 242 to 248 of method 150 are repeated for the second buffer 212b as if the second buffer 212b was the first selected buffer 213a, according to some embodiments. In some embodiments, when the updated second score does not satisfy the timing constraint, 242 to 248 of method 150 are repeated for the third buffer 212c as if the third buffer 212c was the first selected buffer 213a. Treating one or more additional buffers as the first selected buffer is within the scope of various embodiments.

At 252 of method 150, as illustrated in a fourth intermediate stage of fabrication 202d, when the updated second score satisfies the timing constraint the first selected buffer 213a is removed, according to some embodiments. In some embodiments, the first selected buffer 213a is thus determined to be an unnecessary buffer, and the removal of the first selected buffer 213a will decrease power consumption of the semiconductor arrangement 100, with little to no increase in an amount of time a signal takes to pass from the driver 104 to the receiver 106.

Turning to FIG. 2C, which is a continuation from point c of FIG. 2B, at 254 of method 150, as illustrated in a fifth intermediate stage of fabrication 202e, the second buffer 212b is selected to be a second selected buffer 213b based upon the second score, according to some embodiments. In some embodiments, the second buffer 212b is selected to be the second selected buffer 213b when the second delay is a greater delay as compared to the third delay, and the second score is thus a higher score as compared to the third score.

At 256 of method 150, as illustrated in the fifth intermediate stage of fabrication 202e, the interconnection arrangement 200 is rerouted such that the driver 104 is connected to the receiver 106 by a third connection 211 that bypasses the second selected buffer 213b, according to some embodiments. In some embodiments, the third connection 211 comprises a portion of the second connection 210, such as the portion of the second connection 210 that bypassed the first selected buffer 213a. In some embodiments, the third connection 211 comprises a portion of the first connection 108, such as the portion of the first connection 108 that intersects the third buffer 212c and is between the third buffer 212c and the receiver 106. In some embodiments, the third connection 211 is routed through a second upper metal layer of the semiconductor arrangement 100 that is different than the metal layer within which the driver 104 and the receiver 106 are disposed. In some embodiments, the second upper metal layer is at least one of the same metal layer or a different metal layer than the first upper metal layer.

At 258 of method 150, as illustrated in the fifth intermediate stage of fabrication 202e, the updated second score is updated to generate a remaining updated second score when the second buffer 212b is the second selected buffer 213b, according to some embodiments. In some embodiments, generating the remaining updated second score comprises using the Elmore delay model as shown above in equation (1) to calculate the remaining updated second score of a second remaining buffer, where the second remaining buffer is not the first selected buffer 213a or the second selected buffer 213b.

In some embodiments, such as when there is no third buffer 212c, generating the remaining updated second score comprises using the Elmore delay model as shown above in equation (1) to calculate the remaining updated second score of the third connection 211, where no buffers are disposed on the third connection 211. When the third buffer 212c is included, the remaining updated second score corresponds to a delay of the area encompassed by the bracket designating the remaining updated second score, such that a remaining updated second delay measures a delay of a first portion of the third connection 211 between the driver 104 and the third buffer 212c, according to some embodiments.

Also at 258 of method 150, as illustrated in the fifth intermediate stage of fabrication 202e, in some embodiments, such as where the second remaining buffer is the third buffer 212c, the third score is updated to generate an updated third score. In some embodiments, generating the updated third score comprises using the Elmore delay model as shown above in equation (1) to calculate the updated third score of the third connection 211 and the third buffer 212c. In some embodiments, the updated third score corresponds to a delay of the area encompassed by the bracket designating the updated third score, such that an updated third delay measures the delay of the first portion of the third connection 211 between the driver 104 and the third buffer 212c, the delay of the third buffer 212c, and a delay of a second portion of the third connection 211 between the third buffer 212c and the receiver 106.

At 260 of method 150, as illustrated in a sixth intermediate stage of fabrication 202f, when the remaining updated second score satisfies the timing constraint the second selected buffer 213b is removed, according to some embodiments. In some embodiments, such as when the third buffer 212c is disposed on the third connection 211 and when the updated third score satisfies the timing constraint, the second selected buffer 213b is removed, according to some embodiments. In some embodiments, the second selected buffer 213b is thus determined to be an unnecessary buffer, and the removal of the second selected buffer 213b will decrease power consumption of the semiconductor arrangement 100, without increasing an amount of time a signal takes to pass from the driver 104 to the receiver 106. In some embodiments, such as when the updated second score does not satisfy the timing constraint, 254 to 258 of method 150 are repeated for the third buffer 212c as if the third buffer 212c was the second selected buffer 213b, according to some embodiments. Treating one or more additional buffers as the second selected buffer is within the scope of various embodiments.

Figure 3A:
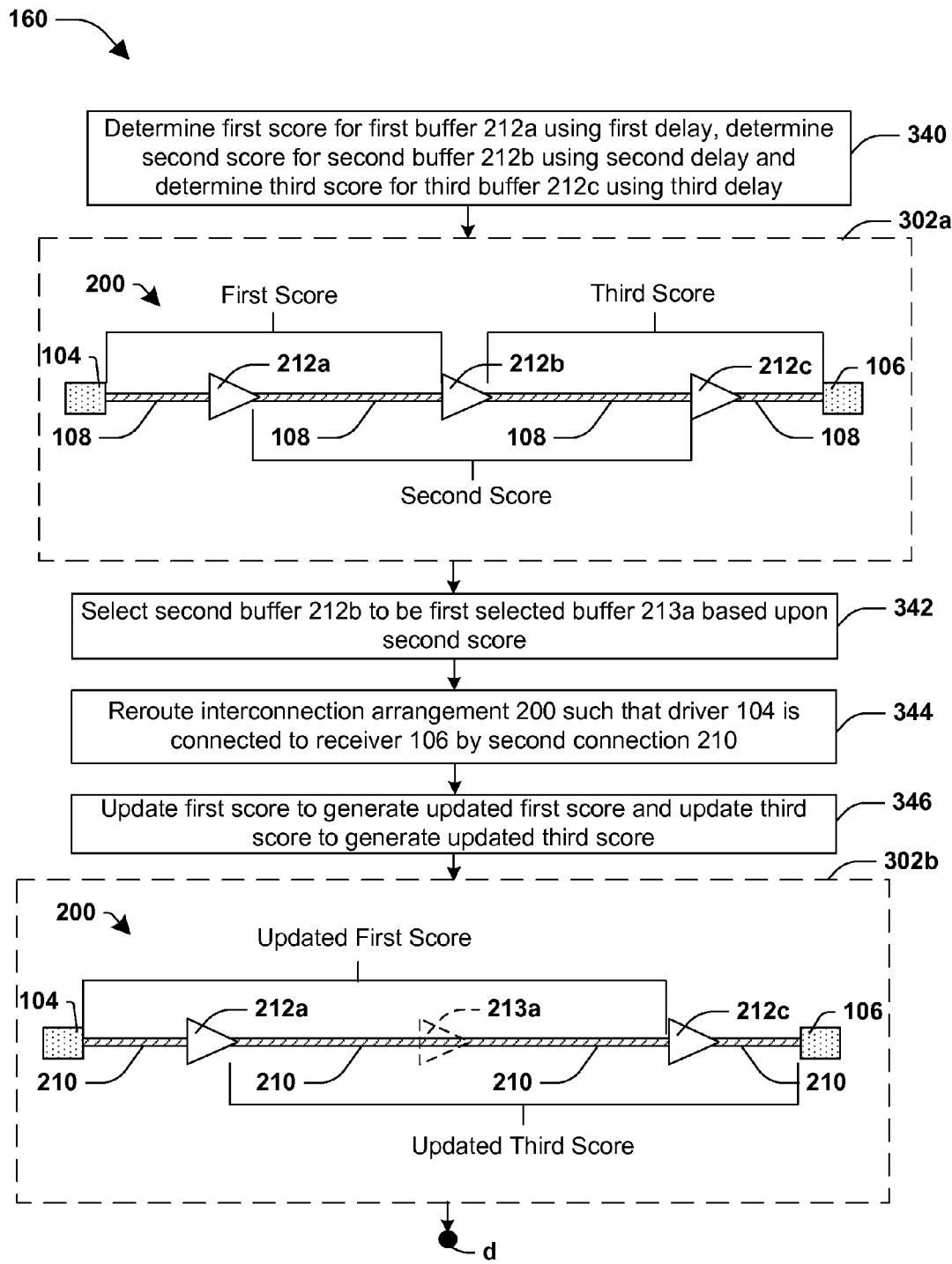
FIG. 3A is a flow diagram illustrating a method of forming a semiconductor arrangement, in accordance with some embodiments.
Figure 3B:
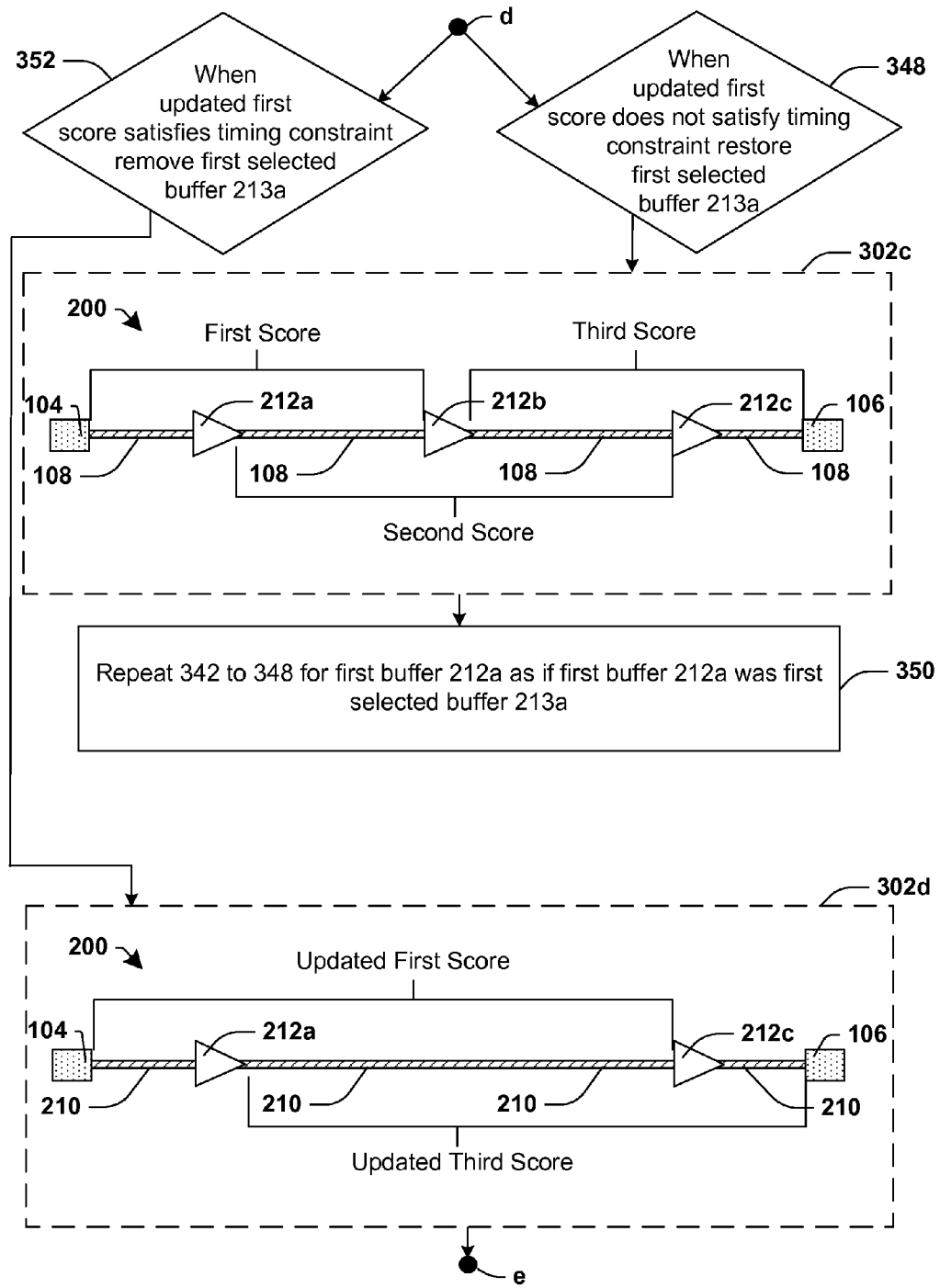
FIG. 3B is a flow diagram illustrating a method of forming a semiconductor arrangement, in accordance with some embodiments.
Figure 3C:
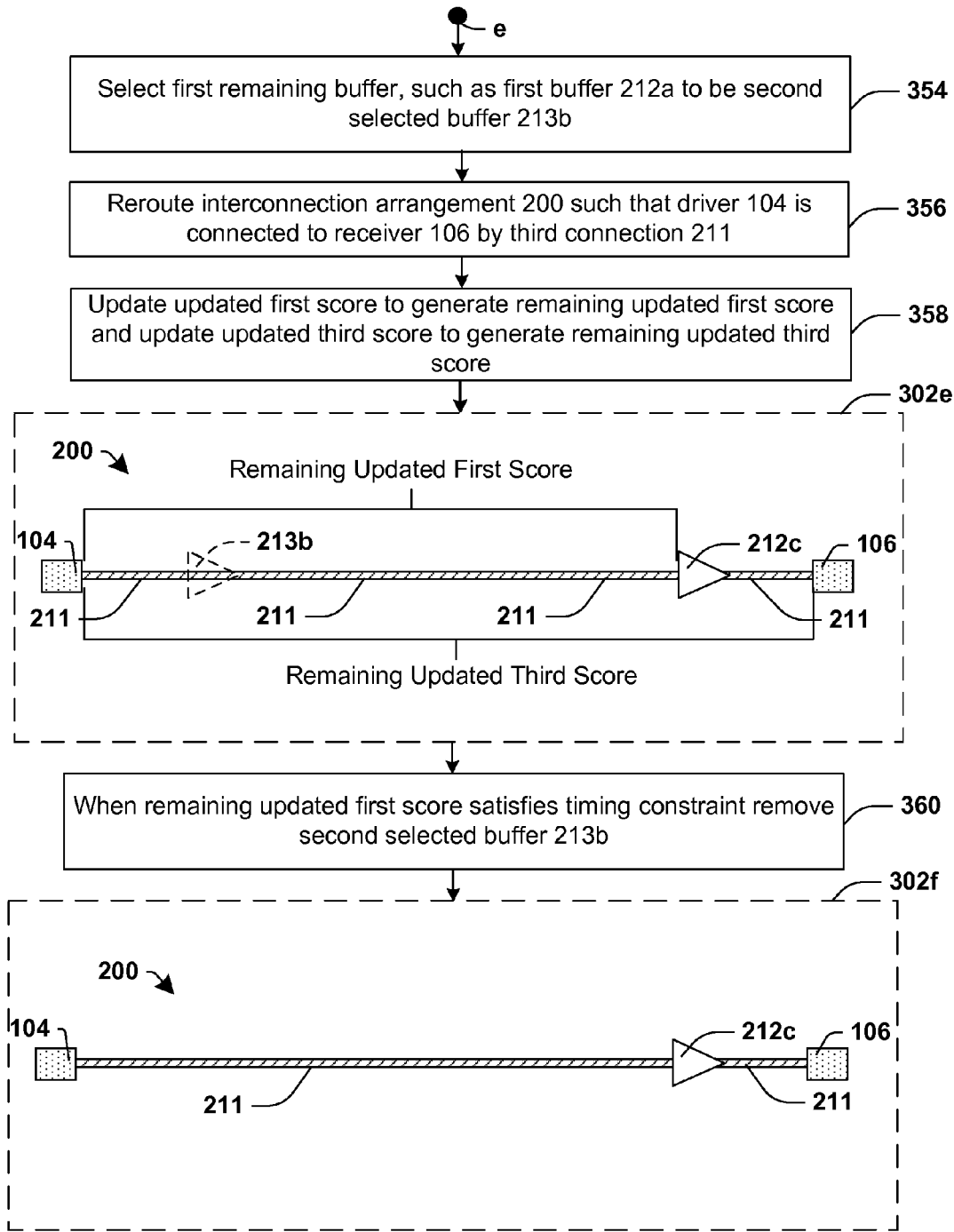
FIG. 3C is a flow diagram illustrating a method of forming a semiconductor arrangement, in accordance with some embodiments.

Turning to FIG. 3A, a method 160 of forming the semiconductor arrangement 100 according to some embodiments is illustrated. The interconnection arrangement 200 is also illustrated in FIGS. 3A-3C to depict the interconnection arrangement 200 at various stages of fabrication 302a-302f corresponding to different operations of the method 160. The interconnection arrangement 200 illustrated in FIG. 3A has three buffers: the first buffer 212a, the second buffer 212b and the third buffer 212c. A different number of buffers is within the scope of various embodiments.

At 340 of method 160, as illustrated in a seventh intermediate stage of fabrication 302a, the first score is determined for the first buffer 212a using the first delay, the second score is determined for the second buffer 212b using the second delay and the third score is determined for the third buffer 212c using the third delay, according to some embodiments. In some embodiments, at least one of the first score of the first buffer 212a, the second score of the second buffer 212b or the third score of the third buffer 212c are determined in the same manner as described above with regards to determining the first score of the first buffer 212a, the second score of the second buffer 212b or the third score of the third buffer 212c at 240 of method 150.

At 342 of method 160, as illustrated in an eighth intermediate stage of fabrication 302b, the second buffer 212b is selected to be the first selected buffer 213a based upon the second score, according to some embodiments. In some embodiments, the second buffer 212b is selected to be the first selected buffer 213a when the second delay is a greater delay as compared to the first delay and the third delay, and the second score is thus a higher score as compared to the first score and the third score.

At 344 of method 160, as illustrated in the eighth intermediate stage of fabrication 302b, the interconnection arrangement 200 is rerouted such that the driver 104 is connected to the receiver 106 by the second connection 210 or other connections different than the first connection 108 that bypasses the first selected buffer 213a, according to some embodiments. In some embodiments, the interconnection arrangement 200 is rerouted in the same manner as described above with regards to rerouting the interconnection arrangement 200 at 244 of method 150.

At 346 of method 160, as illustrated in the eighth intermediate stage of fabrication 302b, the first score is updated to generate the updated first score when the second buffer 212b is the first selected buffer 213a, according to some embodiments. In some embodiments, generating the updated first score comprises using the Elmore delay model as shown above in equation (1) to calculate the first updated delay of a first remaining buffer, where the first remaining buffer is not the first selected buffer 213a.

In some embodiments, the updated first score corresponds to a delay of the area encompassed by the bracket designating the updated first score, such that an updated first delay measures a delay of a third portion of the second connection 210 between the driver 104 and the first buffer 212a, the delay of the first buffer 212a, and a delay of a fourth portion of the second connection 210 between the first buffer 212a and the third buffer 212c. In some embodiments, the first remaining buffer is at least one of the first buffer 212a or the third buffer 212c.

Also at 346 of method 160, as illustrated in the eight intermediate stage of fabrication 302b, the third score is updated to generate the updated third score when the second buffer 212b is the first selected buffer 213a, according to some embodiments. In some embodiments, generating the updated third score comprises using the Elmore delay model as shown above in equation (1) to calculate the second updated delay of the first remaining buffer, where the first remaining buffer is not the first selected buffer 213a. In some embodiments, the updated third score corresponds to a delay of the area encompassed by the bracket designating the updated third score, such that an updated third delay measures a delay of the fourth portion of the second connection 210 between the first buffer 212a and the third buffer 212c, the delay of the third buffer 212c, and a delay of a fifth portion of the second connection 210 between the third buffer 212c and the receiver 106. In some embodiments, the first remaining buffer is at least one of the first buffer 212a or the third buffer 212c.

Turning to FIG. 3B, which is a continuation from point d of FIG. 3A, at 348 of method 160, as illustrated in a ninth intermediate stage of fabrication 302c, when the updated first score does not satisfy the timing constraint the first connection 108 is restored, according to some embodiments. In some embodiments, restoring the first connection 108 comprises returning the second buffer 212b to an original position disposed between the first buffer 212a and the third buffer 212c.

At 350 of method 160, when the updated first score does not satisfy the timing constraint, 342 to 348 of method 160 are repeated for the first buffer 212a as if the first buffer 212a was the first selected buffer 213a, according to some embodiments. In some embodiments, when the updated first score does not satisfy the timing constraint, 342 to 348 of method 160 are repeated for the third buffer 212c as if the third buffer 212c was the first selected buffer 213a. Treating one or more additional buffers as the first selected buffer is within the scope of various embodiments.

At 352 of method 160, as illustrated in a tenth intermediate stage of fabrication 302d, when the updated first score satisfies the timing constraint, the first selected buffer 213a is removed, according to some embodiments. In some embodiments, the first selected buffer 213a is thus determined to be an unnecessary buffer, and the removal of the first selected buffer 213a will decrease power consumption of the semiconductor arrangement 100, with little to no increase in an amount of time a signal takes to pass from the driver 104 to the receiver 106.

Turning to FIG. 3C, which is a continuation from point e of FIG. 3B, at 354 of method 160, as illustrated in an eleventh intermediate stage of fabrication 302e, the first buffer 212a is selected to be the second selected buffer 213b based upon the first score, according to some embodiments. In some embodiments, the first buffer 212a is selected to be the second selected buffer 213b when the first delay is a greater delay as compared to the third delay, and the first score is thus a higher score as compared to the third score.

At 356 of method 160, as illustrated in the eleventh intermediate stage of fabrication 302e, the interconnection arrangement 200 is rerouted such that the driver 104 is connected to the receiver 106 by the third connection 211 or other connection different than the second connection 210 that bypasses the second selected buffer 213b, according to some embodiments. In some embodiments, the interconnection arrangement 200 is rerouted in the same manner as described above with regards to the rerouting the interconnection arrangement 200 at 256 of method 150.

At 358 of method 160, as illustrated in the eleventh intermediate stage of fabrication 302e, the updated first score is updated to generate a remaining updated first score when the first buffer 212a is the second selected buffer 213b, according to some embodiments. In some embodiments, generating the remaining updated first score comprises using the Elmore delay model as shown above in equation (1) to calculate the remaining updated first score of the second remaining buffer, where the second remaining buffer is not the first selected buffer 213a or the second selected buffer 213b.

In some embodiments, such as when there is no third buffer 212c, generating the remaining updated first score comprises using the Elmore delay model as shown above in equation (1) to calculate the remaining updated first score of the third connection 211, where no buffers are disposed on the third connection 211. When the third buffer 212c is included, the remaining updated first score corresponds to a delay of the area encompassed by the bracket designating the remaining updated first score, such that a remaining updated first delay measures the delay of the first portion of the third connection 211 between the driver 104 and the third buffer 212c, according to some embodiments.

Also at 358 of method 160, as illustrated in the eleventh intermediate stage of fabrication 302e, in some embodiments, such as where the second remaining buffer is the third buffer 212c, the updated third score is updated to generate a remaining updated third score. In some embodiments, generating the remaining updated third score comprises using the Elmore delay model as shown above in equation (1) to calculate the remaining updated third score of the third connection 211 and the third buffer 212c. In some embodiments, the remaining updated third score corresponds to a delay of the area encompassed by the bracket designating the remaining updated third score, such that a remaining updated third delay measures the delay of the first portion of the third connection 211 between the driver 104, the delay of the third buffer 212c, and the delay of the second portion of the third connection 211 between the third buffer 212c and the receiver 106.

At 360 of method 160, as illustrated in a twelfth intermediate stage of fabrication 302f, when the remaining updated first score satisfies the timing constraint, the second selected buffer 213b is removed, according to some embodiments. In some embodiments, such as when the third buffer 212c is disposed on the third connection 211 and when the remaining updated third score satisfies the timing constraint, the second selected buffer 213b is removed, according to some embodiments. In some embodiments, the second selected buffer 213b is thus determined to be an unnecessary buffer, and the removal of the second selected buffer 213b will decrease power consumption of the semiconductor arrangement 100, with little to no increase in an amount of time a signal takes to pass from the driver 104 to the receiver 106. In some embodiments, such as when the remaining updated third score does not satisfy the timing constraint, 354 to 360 of method 160 are repeated for the third buffer 212c as if the third buffer 212c was the second selected buffer 213b, according to some embodiments. Treating one or more additional buffers as the second selected buffer 213b is within the scope of various embodiments. In some embodiments, such as when at least one of the updated first score does not satisfy the timing constraint, the updated third score does not satisfy the timing constraint, the remaining updated first score does not satisfy the timing constraint or the remaining updated third score does not satisfy the timing constraint, a second remaining buffer is selected to be a third selected buffer, where the second remaining buffer is not the first selected buffer 213a or the second selected buffer 213b.

Figure 4A:
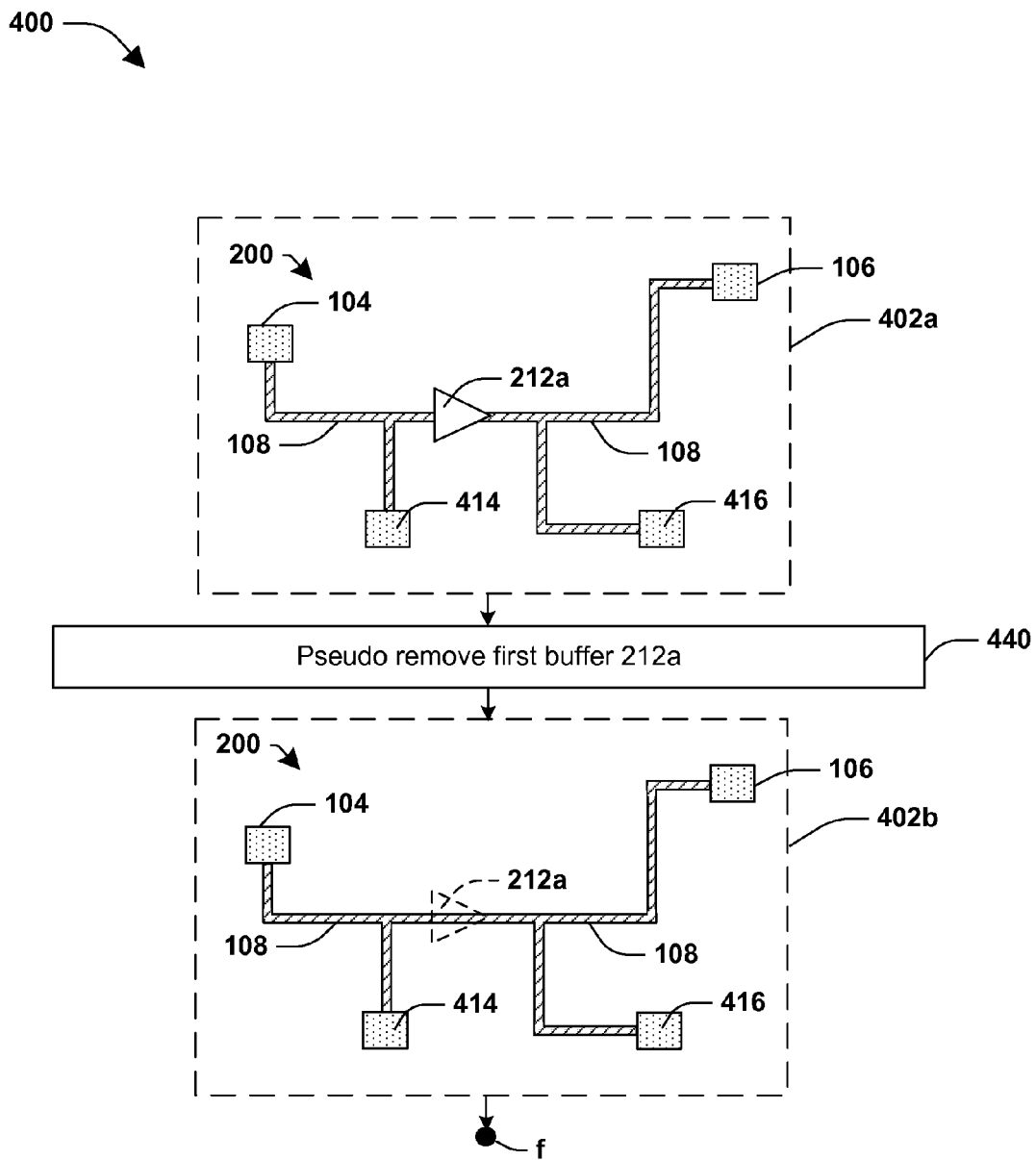
FIG. 4A is a flow diagram illustrating a method of forming a semiconductor arrangement, in accordance with some embodiments.
Figure 4B:
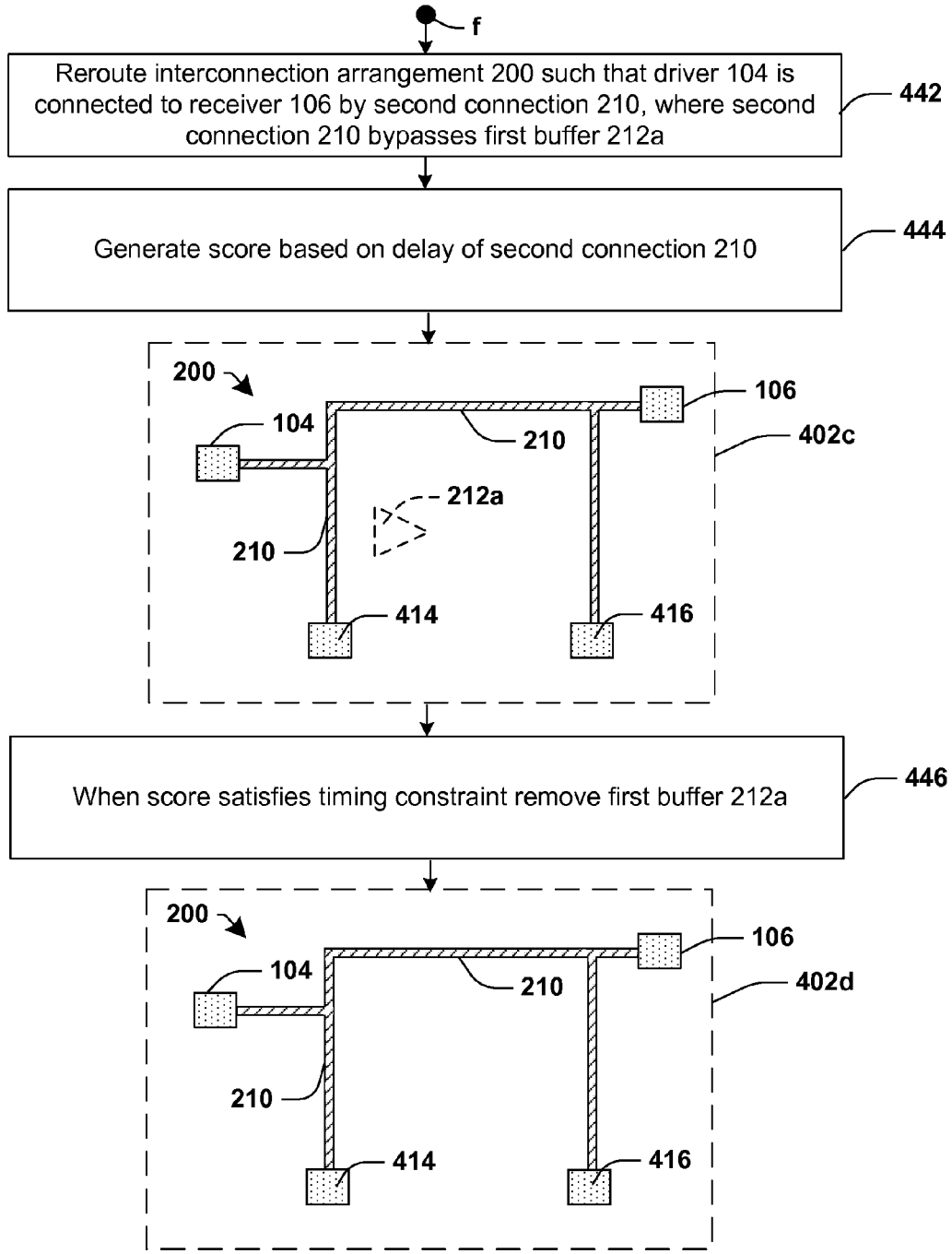
FIG. 4B is a flow diagram illustrating a method of forming a semiconductor arrangement, in accordance with some embodiments.

Turning to FIG. 4A, a method 400 of forming the semiconductor arrangement 100 according to some embodiments is illustrated. The interconnection arrangement 200 is also illustrated in FIGS. 4A-4B to depict the interconnection arrangement 200 at various stages of fabrication 402-402d corresponding to different operations of the method 400. In some embodiments, the interconnection arrangement 200 illustrated in FIG. 4A has one buffer: the first buffer 212a. A different number of buffers is within the scope of various embodiments.

In some embodiments, a thirteenth intermediate stage of fabrication 402a is illustrated. In some embodiments, the interconnection arrangement 200 comprises the first connection 108 between the driver 104 and the receiver 106, where the first buffer 212a is disposed along the first connection 108 between the driver 104 and the receiver 106. In some embodiments, a first component node 414 and a second component node 416 are connected to the first connection 108.

At 440 of method 400, as illustrated in a fourteenth intermediate stage of fabrication 402b, the first buffer 212a is pseudo removed from the first connection 108, according to some embodiments. In some embodiments, pseudo removing the first buffer 212a comprises restricting power to the first buffer 212a.

Turning to FIG. 4B, which is a continuation from point f of FIG. 4A, at 442 of method 400, as illustrated in a fifteenth intermediate stage of fabrication 402c, the interconnection arrangement 200 is rerouted such that the driver 104 is connected to the receiver 106 by the second connection 210 or other connection different than the first connection 108, where the second connection 210 bypasses the first buffer 212a, according to some embodiments. In some embodiments, the second connection 210 comprises a portion of the first connection 108, such as the portion of the first connection 108 that intersects at least one of the driver 104 or the receiver 106. In some embodiments, the second connection 210 is routed such that the second connection 210 is connected to at least one of the first component node 414 or the second component node 416. In some embodiments, the second connection 210 is routed through an upper metal layer of the semiconductor arrangement 100 that is different than a metal layer within which the driver 104 and the receiver 106 are disposed.

At 444 of method 400, as illustrated in the fifteenth intermediate stage of fabrication 402c, a score based on a delay of the second connection 210 is generated, according to some embodiments. In some embodiments, the generating the score comprises using the Elmore delay model as shown above in equation (1) to calculate the delay of the second connection 210.

At 446 of method 400, as illustrated in a sixteenth intermediate stage of fabrication 402d, the first buffer 212a is removed when the score satisfies the timing constraint, according to some embodiments. In some embodiments, the first buffer 212a is not removed, and the first connection 108 is restored when the score does not satisfy the timing constraint. In some embodiments, when the score satisfies the timing constraint, the first buffer 212a is thus determined to be an unnecessary buffer, and the removal of the first buffer 212a will decrease power consumption of the semiconductor arrangement 100, with little to no increase in an amount of time a signal takes to pass from the driver 104 to the receiver 106.

According to some embodiments, a method of forming a semiconductor arrangement comprises determining a first delay for a first buffer in an interconnection arrangement, where the interconnection arrangement comprises a first connection between a driver and a receiver and the first buffer is disposed along the first connection between the driver and the receiver and determining a second delay for a second buffer in the interconnection arrangement, where the second buffer is disposed along the first connection between the driver and the receiver. According to some embodiments, the method of forming a semiconductor arrangement comprises determining a first score for the first buffer based upon the first delay and determining a second score for the second buffer based upon the second delay. According to some embodiments, the method of forming a semiconductor arrangement comprises selecting the first buffer to be a first selected buffer based upon the first score or selecting the second buffer to be the first selected buffer based upon the second score. According to some embodiments, the method of forming a semiconductor arrangement comprises rerouting the interconnection arrangement such that the driver is connected to the receiver by a second connection that bypasses the first selected buffer and at least one of updating the first score to generate an updated first score when the second buffer is the first selected buffer or updating the second score to generate an updated second score when the first buffer is the first selected buffer. According to some embodiments, the method of forming a semiconductor arrangement comprises at least one of removing the first selected buffer when the first buffer is the first selected buffer and the updated second score satisfies a timing constraint, or removing the first selected buffer when the second buffer is the first selected buffer and the updated first score satisfies the timing constraint.

According to some embodiments, a method of forming a semiconductor arrangement comprises rerouting an interconnection arrangement comprising a first connection between a driver and a receiver, where a first buffer is disposed along the first connection between the driver and the receiver, such that the driver is connected to the receiver by a second connection that bypasses the first buffer. According to some embodiments, the method of forming a semiconductor arrangement comprises generating a score based on a delay of the second connection and removing the first buffer when the score satisfies a timing constraint.

According to some embodiments, a method of forming a semiconductor arrangement comprises determining a first delay for a first buffer in an interconnection arrangement, where the interconnection arrangement comprises a first connection between a driver and a receiver and the first buffer is disposed along the first connection between the driver and the receiver and determining a second delay for a second buffer in the interconnection arrangement, where the second buffer is disposed along the first connection between the driver and the receiver. According to some embodiments, the method of forming a semiconductor arrangement comprises determining a first score for the first buffer based upon the first delay and determining a second score for the second buffer based upon the second delay. According to some embodiments, the method of forming a semiconductor arrangement comprises selecting the first buffer to be a first selected buffer based upon the first score or selecting the second buffer to be the first selected buffer based upon the second score. According to some embodiments, the method of forming a semiconductor arrangement comprises rerouting the interconnection arrangement such that the driver is connected to the receiver by a second connection that bypasses the first selected buffer and at least one of updating the first score to generate an updated first score when the second buffer is the first selected buffer or updating the second score to generate an updated second score when the first buffer is the first selected buffer. According to some embodiments, the method of forming a semiconductor arrangement comprises at least one of removing the first selected buffer when the first buffer is the first selected buffer and the updated second score satisfies a timing constraint, or removing the first selected buffer when the second buffer is the first selected buffer and the updated first score satisfies the timing constraint. According to some embodiments, the method of forming a semiconductor arrangement comprises selecting a first remaining buffer to be a second selected buffer in the interconnection arrangement, where the first remaining buffer is not the first selected buffer and rerouting the interconnection arrangement such that the driver is connected to the receiver by a third connection that bypasses the second selected buffer. According to some embodiments, the method of forming a semiconductor arrangement comprises at least one of updating the updated first score to generate a remaining updated first score when the first buffer is the second selected buffer or updating the updated second score to generate a remaining updated second score when the second buffer is the second selected buffer. According to some embodiments, the method of forming a semiconductor arrangement comprises at least one of removing the second selected buffer when the first buffer is the second selected buffer and the remaining updated first score satisfies the timing constraint or removing the second selected buffer when the second buffer is the second selected buffer and the remaining updated second score satisfies the timing constraint.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers features, elements, etc. mentioned herein, such as etching techniques, planarization techniques, implanting techniques, doping techniques, spin-on techniques, sputtering techniques such as magnetron or ion beam sputtering, growth techniques, such as thermal growth or deposition techniques such as chemical vapor deposition (CVD), physical vapor deposition (PVD), plasma enhanced chemical vapor deposition (PECVD), or atomic layer deposition (ALD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of forming a semiconductor arrangement comprising:
   determining a first delay for a first buffer in an interconnection arrangement, where the interconnection arrangement comprises a first connection between a driver and a receiver and the first buffer is disposed along the first connection between the driver and the receiver;
   determining a second delay for a second buffer in the interconnection arrangement, where the second buffer is disposed along the first connection between the driver and the receiver;
   determining a first score for the first buffer based upon the first delay;
   determining a second score for the second buffer based upon the second delay;
   selecting the first buffer to be a first selected buffer based upon the first score or selecting the second buffer to be the first selected buffer based upon the second score;
   rerouting the interconnection arrangement such that the driver is connected to the receiver by a second connection that bypasses the first selected buffer;
   at least one of:
      updating the first score to generate an updated first score when the second buffer is the first selected buffer, or
      updating the second score to generate an updated second score when the first buffer is the first selected buffer; and
   at least one of:
      removing the first selected buffer when the first buffer is the first selected buffer and the updated second score satisfies a timing constraint, or
      removing the first selected buffer when the second buffer is the first selected buffer and the updated first score satisfies the timing constraint.

2. The method of claim 1, at least one of:
   the determining a first delay comprising using an Elmore delay model to calculate the first delay associated with the first buffer, or
   the determining a second delay comprising using the Elmore delay model to calculate the second delay associated with the second buffer.

3. The method of claim 1, at least one of the generating an updated first score or the generating an updated second score comprising using an Elmore delay model to calculate a first updated delay of a first remaining buffer, where the first remaining buffer is not the first selected buffer.

4. The method of claim 1, the rerouting the interconnection arrangement comprising routing the second connection through an upper metal layer of the semiconductor arrangement, where the driver and the receiver are in a lower metal layer of the semiconductor arrangement.

5. The method of claim 1, at least one of:
   when the updated first score does not satisfy the timing constraint, restoring the first connection, or
   when the updated second score does not satisfy the timing constraint, restoring the first connection.

6. The method of claim 1, comprising selecting a first remaining buffer to be a second selected buffer in the interconnection arrangement, where the first remaining buffer is not the first selected buffer and rerouting the interconnection arrangement such that the driver is connected to the receiver by a third connection that bypasses the second selected buffer.

7. The method of claim 6, at least one of:
   responsive to removing the first selected buffer, updating the updated first score to generate a remaining updated first score when the first buffer is the second selected buffer, or
   responsive to removing the first selected buffer, updating the updated second score to generate a remaining updated second score when the second buffer is the second selected buffer.

8. The method of claim 7, at least one of:
   removing the second selected buffer when the first buffer is the second selected buffer and the remaining updated first score satisfies the timing constraint, or
   removing the second selected buffer when the second buffer is the second selected buffer and the remaining updated second score satisfies the timing constraint.

9. A method of forming a semiconductor arrangement comprising:
   determining a first delay for a first buffer in an interconnection arrangement, where the interconnection arrangement comprises a first connection between a driver and a receiver and the first buffer is disposed along the first connection between the driver and the receiver;
   determining a second delay for a second buffer in the interconnection arrangement, where the second buffer is disposed along the first connection between the driver and the receiver;
   determining a first score for the first buffer based upon the first delay;

determining a second score for the second buffer based upon the second delay;
selecting the first buffer to be a first selected buffer based upon the first score or selecting the second buffer to be the first selected buffer based upon the second score;
rerouting the interconnection arrangement such that the driver is connected to the receiver by a second connection that bypasses the first selected buffer;
at least one of:
 updating the first score to generate an updated first score when the second buffer is the first selected buffer, or
 updating the second score to generate an updated second score when the first buffer is the first selected buffer;
at least one of:
 removing the first selected buffer when the first buffer is the first selected buffer and the updated second score satisfies a timing constraint, or
 removing the first selected buffer when the second buffer is the first selected buffer and the updated first score satisfies the timing constraint;
selecting a first remaining buffer to be a second selected buffer in the interconnection arrangement, where the first remaining buffer is not the first selected buffer;
rerouting the interconnection arrangement such that the driver is connected to the receiver by a third connection that bypasses the second selected buffer;
at least one of:
 updating the updated first score to generate a remaining updated first score when the first buffer is the second selected buffer, or
 updating the updated second score to generate a remaining updated second score when the second buffer is the second selected buffer; and
at least one of:
 removing the second selected buffer when the first buffer is the second selected buffer and the remaining updated first score satisfies the timing constraint, or
 removing the second selected buffer when the second buffer is the second selected buffer and the remaining updated second score satisfies the timing constraint.

10. The method of claim 9, at least one of:
the determining a first delay comprising using an Elmore delay model to calculate the first delay associated with the first buffer, or
the determining a second delay comprising using the Elmore delay model to calculate the second delay associated with the second buffer.

11. The method of claim 9, at least one of the generating an updated first score or the generating an updated second score comprising using an Elmore delay model to calculate a first updated delay of a first remaining buffer, where the first remaining buffer is not the first selected buffer.

12. The method of claim 9, at least one of:
the rerouting the interconnection arrangement such that the driver is connected to the receiver by a second connection comprising routing the second connection through a first upper metal layer of the semiconductor arrangement, where the driver and the receiver are in a lower metal layer of the semiconductor arrangement, or
the rerouting the interconnection arrangement such that the driver is connected to the receiver by a second connection comprising routing the second connection through a second upper metal layer of the semiconductor arrangement, where the driver and the receiver are in the lower metal layer.

13. The method of claim 9, at least one of:
when the updated first score does not satisfy the timing constraint, restoring the first connection, or
when the updated second score does not satisfy the timing constraint, restoring the first connection.

14. The method of claim 13, at least one of:
when the remaining updated first score does not satisfy the timing constraint, restoring the second connection, or
when the remaining updated second score does not satisfy the timing constraint, restoring the second connection.

15. The method of claim 14, responsive to at least one of the updated first score not satisfying the timing constraint, the updated second score not satisfying the timing constraint, the remaining updated first score not satisfying the timing constraint or the remaining updated second score not satisfying the timing constraint, selecting a second remaining buffer to be a third selected buffer, where the second remaining buffer is not the first selected buffer or the second selected buffer.

16. The method of claim 15, comprising rerouting the interconnection arrangement such that the driver is connected to the receiver by a fourth connection that bypasses the third selected buffer.

17. A method of forming a semiconductor arrangement comprising:
determining a first delay for a first buffer in an interconnection arrangement, where the interconnection arrangement comprises a first connection between a driver and a receiver and the first buffer is disposed along the first connection between the driver and the receiver;
determining a second delay for a second buffer in the interconnection arrangement, where the second buffer is disposed along the first connection between the driver and the receiver;
comparing the first delay to the second delay to determine a first score for the first buffer and a second score for the second buffer;
selecting the first buffer to be a first selected buffer based upon the first score or selecting the second buffer to be the first selected buffer based upon the second score;
rerouting the interconnection arrangement such that the driver is connected to the receiver by a second connection that bypasses the first selected buffer;
at least one of:
 updating the first score to generate an updated first score when the second buffer is the first selected buffer, or
 updating the second score to generate an updated second score when the first buffer is the first selected buffer; and
at least one of:
 removing the first selected buffer when the first buffer is the first selected buffer and the updated second score satisfies a timing constraint, or
 removing the first selected buffer when the second buffer is the first selected buffer and the updated first score satisfies the timing constraint.

18. The method of claim 17, the selecting comprising:
selecting the first buffer to be a first selected buffer when the first score is greater than the second score; and
selecting the second buffer to be a first selected buffer when the second score is greater than the first score.

19. The method of claim 17, at least one of:
when the updated first score does not satisfy the timing constraint, restoring the first connection, or
when the updated second score does not satisfy the timing constraint, restoring the first connection.

20. The method of claim 17, at least one of:
the determining a first delay comprising using an Elmore delay model to calculate the first delay associated with the first buffer, or
the determining a second delay comprising using the Elmore delay model to calculate the second delay associated with the second buffer.

* * * * *